United States Patent [19]
Murayama

[11] 3,869,958
[45] Mar. 11, 1975

[54] SCREW GROMMET
[75] Inventor: Hiroo Murayama, Tokyo, Japan
[73] Assignee: Illinois Tool Works Inc., Chicago, Ill.
[22] Filed: Sept. 13, 1972
[21] Appl. No.: 288,625

[30] Foreign Application Priority Data
Sept. 13, 1971 Japan.............................. 46-82566

[52] U.S. Cl..................................... 85/80, 24/73 P
[51] Int. Cl.............................................. F16b 13/08
[58] Field of Search ........ 85/80, 5 R, 84; 24/208 A, 24/213 R, 213 CS, 214, 73 P, 73 PM, 73 HS; 151/41.75

[56] References Cited
UNITED STATES PATENTS
| | | | |
|---|---|---|---|
| 2,836,214 | 5/1958 | Rapata | 85/80 |
| 2,975,814 | 3/1961 | Tinnerman | 85/80 |
| 3,341,903 | 9/1967 | Buntic | 85/80 X |
| 3,478,395 | 11/1969 | Flora | 24/73 P |
| 3,574,899 | 4/1971 | Fisher | 85/80 X |
| 3,701,373 | 10/1972 | Wronke | 85/80 X |

FOREIGN PATENTS OR APPLICATIONS
| | | | |
|---|---|---|---|
| 1,124,378 | 8/1968 | Great Britain | 85/80 |
| 1,332,253 | 6/1963 | France | 85/80 |

Primary Examiner—Ramon S. Britts
Attorney, Agent, or Firm—Robert W. Beart; J. R. Halvorsen

[57] ABSTRACT

This invention relates to a unique and improved one-piece plastic anchor device for accommodating the threaded shank of a screw member when positioned within a work aperture. The anchor device disclosed herein includes a head section for clampingly engaging one side of a workpanel, and a bisected shank section comprising a longitudinal hollow portion for accommodating a screw shank and longitudinal reinforcing rib portions.

2 Claims, 5 Drawing Figures

SCREW GROMMET

BACKGROUND OF THE INVENTION

This invention relates generally to improvements in a plastic fastener, and more particularly to the provision of a unique and improved plastic device for fastening a fixture plate to a work panel.

This invention is an improvement of a panel fastener made of plastic in which the shank section of the fastener is pushed in the hole of a workpanel until the head section of the fastener is positioned on one surface of the workpanel, a fixture panel being laid on the head section of the fastener and mounted to the workpanel by means of a bolt which is inserted in and threadly engages the longitudinal hole of the shank section.

The shank section of the fastener is ordinarily made somewhat larger than the hole of the workpanel. For this reason and because of the resiliency inherent to plastic material the shank section of the fastener when inserted in the hole of the workpanel, will yieldingly fit and clampingly engage the hole of the workpanel without deforming the longitudinal hole of the shank section. The conventional panel fastener is designed to have critical cross dimensions especially suited to the diameter of the hole of the workpanel so as to meet the requirements above mentioned.

Otherwise, in instances where a fastener is applied to a workpanel whose thickness or aperture size is somewhat different from given standards (particularly in instance where the aperture at a workpanel is relatively small), the resilience of the shank section is not sufficient to allow the shank section to collapse and to pass through the aperture, or in some instances the longitudinal hole for accommodating a bolt is badly deformed after the fastener is pushed into the aperture of the workpanel. Contrary to the above, in instances where the aperture is large, the fastener cannot be fixed to the workpanel because of looseness.

SUMMARY OF THE INVENTION

This invention overcomes the defects mentioned above by endowing the shank section of a plastic fastener with substantially increased resilience sufficient to allow the shank section to collapse and pass through relatively small apertures, and to allow the same to clampingly engage relatively large apertures, thus permitting the fastener to adapt to a wide range of varying aperture size.

The foregoing and other objects and advantages will be more apparent from the following description when considered in connection with the accompanying drawing.

DESCRIPTION OF THE PREFERRED EMBODIMENT

Figure 1:
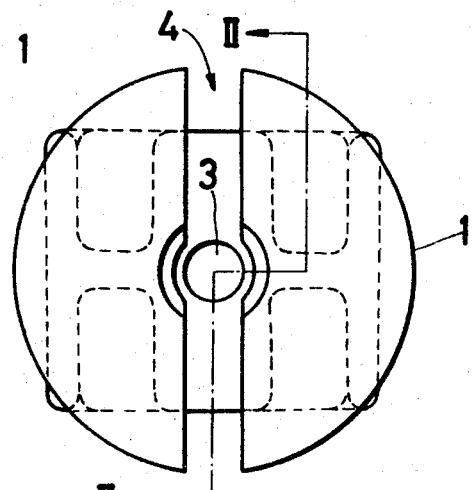
FIG. 1 is a plane view of a panel fastener according to this invention.
Figure 2:
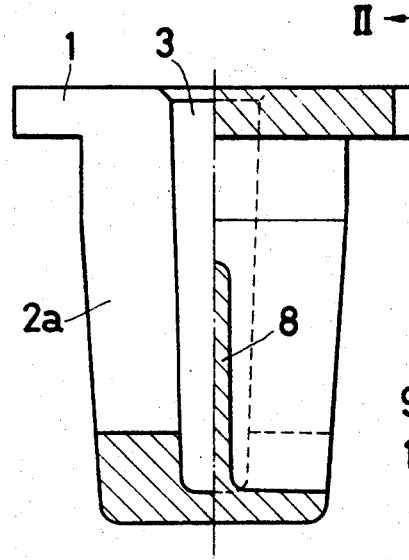
FIG. 2 is a sectional view of the panel fastener taken along the II — II line of FIG. 1.

Refering to the drawings, numeral 1 is a flat head section from which a shank section 2 extends longitudinally. A bolt-insertion hole 3 is made along the longitudinal axis of the head and shank sections 1 and 2. In the embodiment the shank section is bisected as indicated at 4 and is thus composed of two shank halves 2a, 2a whose end portions are integrally jointed. Each shank half 2a has a bulging shoulder portion 5, which leads to a neck portion 6 adjacent to the head section. The shank section is tapered as a whole.

Each shank half is carved to leave two opposing walls and a reinforcing rib portion 8. The rib extends upward from the bottom in the space 7, but does not reach so high as the shoulder portion 5.

Figure 3:
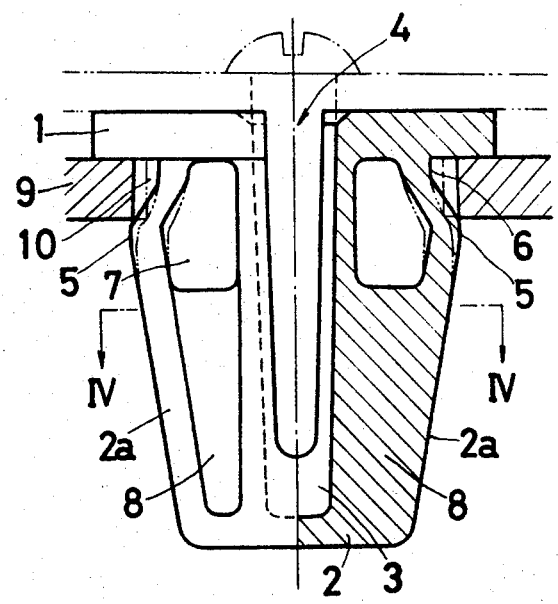
FIG. 3 is a front view showing the panel fastener partly in section.
Figure 4:
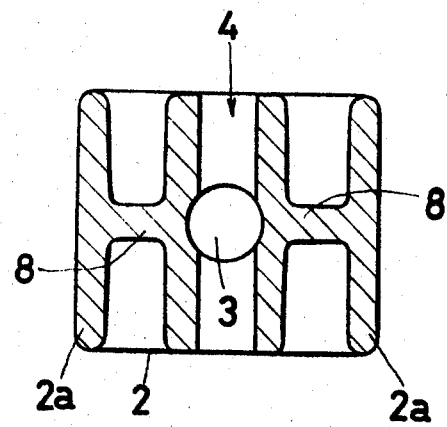
FIG. 4 is a sectional view of the panel fastener taken along the IV — IV line of FIG. 3.
Figure 5:
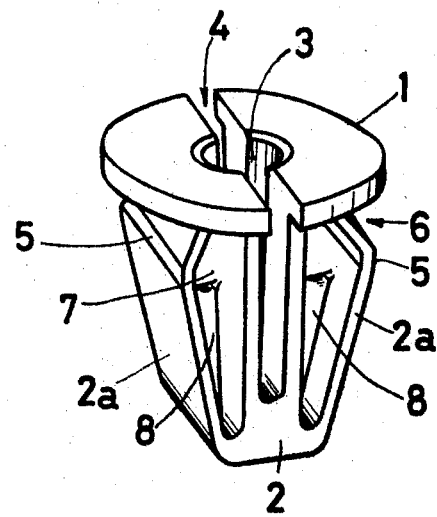
FIG. 5 is a perspective view of the panel fastener.

In inserting the panel fastener in an aperture 10 of a workpanel 9 as shown in FIG. 3, the snap action provided by the bisected shank section allows the fastener to collapse and thus to pass through the aperture 10 whose diameter is smaller than the cross dimensions of the shank portion in the normal or stress-free state.

Also, the upper space 7 allows the bulging shoulder portions 7 to inwardly recede without deforming the bolt accommodating hole 3, thus permitting the panel fastener to fit in an aperture whose diameter is smaller than that of the standard sized aperture for the workpanel.

In fixing a panel fastener to a workpanel, the reinforcing ribs 8 of the fastener will function to apply the counter force to outwardly push the shoulder portions, thus causing the shoulder portions to clampingly engage the inner periphery of the aperture of the workpanel, and finally assuring the positive mounting of a fixture panel 11, which is bolted to the workpanel.

As mentioned above, the shoulder portion of the shank when inserted into the aperture of a workpanel, will recede inwardly without deforming the bolt accommodating hole 3, and at the same time the reinforcing ribs function to apply resilient force, thus allowing the panel fastener to fit in an aperture of the workpanel, inrespective of whether the workpanel is thicker or thinner than the standard panel. Advantageously this unique structure makes possible greater application of the panel fastener.

A particular embodiment of this invention is described above, but as is apparent to those skilled in the art it is possible to modify the embodiment without departing from the spirit of this invention. For instance, the space portion 7 need not extend over the full length of the shank portion as shown in the drawings but may be limited to the area extending from the neck 6 to the shoulder 5. The reinforcing ribs may be extended up to or beyond the shoulder portion 5, provided that the ribs thus extended will not prevent the shoulder 5 from inwardly receding when the shank portion of the fastener is inserted in the aperture of workplate.

What is claimed is:

1. A one piece plastic anchor device for application to a non-circular apertured workpanel to accommodate a threaded shank of a screw member, said anchor member including a head section providing a surface for clampingly engaging one side of the workpanel and a tapered shank section extending longitudinally from said head section, said head and shank sections being bifurcated by a common slot which extends through said head into said shank to a point adjacent the free end of said shank defining a pair of shank sections where said shank sections are integrally joined, each of said shank sections including an inner wall extending from the head to the free end and having a central screw receiving axially extending groove which extends through each section of said head and an outer wall spaced from the inner wall also extending from the head to the free end and which is tapered outwardly from the free end to an intermediate point spaced from said head to define an impositive shoulder for initial engagement with the opposite surface of said workpanel, said outer walls over a limited axial extent thereof between said head and a transverse plane axially spaced below said shoulder being flexible toward one another so that insertion of the fastener into any one of a plurality of different sized apertured workpanels will flex said outer wall inwardly to form a positive shoulder for retention and integrally connected rigid reinforcing means extending radially from each inner walls to the adjacent outer walls and further extending axially from said free end to said transverse plane axially spaced from said shoulder to reinforce said outer wall and adapted to reinforce said positive shoulder by strut action when a screw is introduced into said groove and expands the shank sections.

2. A device of the type claimed in claim 1 wherein said reinforcing means is a solid mass substantially filling the transverse opening between said walls.

* * * * *